United States Patent Office 3,408,379
Patented Oct. 29, 1968

3,408,379
TRIS(DIMETHYLSILYL)AMINE
Donald E. McVannel, Merrill, Mich., assignor to Dow Corning Corporation, Midland, Mich., a corporation of Michigan
No Drawing. Filed Aug. 13, 1965, Ser. No. 479,656
20 Claims. (Cl. 260—448.2)

---

ABSTRACT OF THE DISCLOSURE

Tris(dimethylsilyl)amine, a useful crosslinker, is disclosed. Also disclosed are methods of preparation of the tris(dimethylsilyl)amine as shown by the following equations:

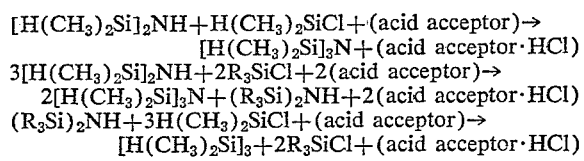

where R is a monovalent hydrocarbon radical.

---

This invention relates to tris(dimethylsilyl)amine and to a method of preparing same.

Compounds which contain silicon-nitrogen bonds are known. To prepare compounds which have three silicon atoms bonded to one nitrogen atom has been difficult and known methods require harsh conditions. The harsh conditions do not permit the preparation of silicon-nitrogen compounds with all varieties of functional groups.

An object of this invention is to prepare tris(dimethylsilyl)amine. Another object is to provide a convenient method for preparing tris(dimethylsilyl)amine. Other objects and advantages will become apparent from the following detailed description.

This invention relates to a method for preparing tris(dimethylsilyl)amine comprising (I) mixing in the presence of an acid acceptor selected from the group consisting of pyridine, picolines and tertiary amines, (A) a bis(organosilyl)amine selected from the group consisting of bis(dimethylsilyl)amine and bis(triorganosilyl)amine where the organo radical is a monovalent hydrocarbon radical, and (B) an organomonochlorosilane selected from the group consisting of dimethylmonochlorosilane and triorganomonochlorosilane where the organo radical is a monovalent hydrocarbon radical, when (A) is bis (triorganosilyl)amine, (B) is dimethylmonochlorosilane and thereafter (II) recovering the tris(dimethylsilyl)amine.

The bis(dimethylsilyl)amine and the bis(triorganosilyl) amine can be prepared by known methods, such as sparging an organic solvent solution of dimethylmonochlorosilane or triorganomonochlorosilane with ammonia. The organic solvent can be any inert organic solvent for the reactants such as cyclohexane. A dilute solution is preferred such as 10 to 30 weight percent dimethylmonochlorosilane or triorganomonochlorosilane. The reaction is exothermic and can be cooled with an ice bath. The ammonium chloride is filtered from the solution and the bis (dimethylsilyl)amine or bis(triorganosilyl)amine is distilled from the solvent.

The triorganomonochlorosilanes which can be used are known compounds and can be found in the art and purchased commercially. Examples of monovalent hydrocarbon radicals are methyl, ethyl, propyl, butyl, hexyl, octadecyl, vinyl, allyl, methallyl, cyclohexyl, cyclohexenyl, phenyl, tolyl, xylyl, xenyl, naphthyl, β-phenylethyl, benzyl and p-ethylphenyl. The organo radicals on any one silicon atom can be the same or different.

An inert organic solvent can be used in the preparation of tris(dimethylsilyl)amine but it is not required and preferably no solvent is used. Such solvents as cyclohexane, toluene, xylene, benzene, tetrahydrofuran and octane can be used. The organic solvent is preferably cyclohexane if any is used. The bis(organosilyl)amine can be mixed with an inert organic solvent in an amount of up to 40 weight percent.

The organomonochlorosilane is added to bis(organosilyl)amine in the presence of an acid acceptor. The acid acceptor should be mixed with bis(organosilyl)amine before the addition of the organomonochlorosilane. Acid acceptors which can be used are pyridine, picolines and tertiary amines. The amount of acid acceptor to be used should be sufficient to neutralize any acid formed. The acid acceptor is present in an amount such that at least one molecule of acid acceptor is present for each molecule of dimethylmonochlorosilane or triorganomonochlorosilane. Preferably, the acid acceptor is present in an amount of 5 to 15 mol percent excess based on the amount stated above.

One preparation of tris(dimethylsilyl)amine is the addition of the dimethylmonochlorosilane to the bis(dimethylsilyl)amine solution which can be accomplished in any desired manner. Preferably, the dimethylmonochlorosilane is maintained at a concentration such that the molar ratio of unreacted dimethylmonochlorosilane to bis(dimethylsilyl)amine is less than 1 to 2, preferably less than 1 to 4. All of the ingredients can be placed in a container and allowed to react for up to 24 hours or more.

The reaction conveniently takes place at room temperature. Slight cooling and heating can also be used. Temperatures such as 10° to 40° C. can be used. The reaction goes to completion in a relatively short time and no extended mixing and heating are necessary. Once the ingredients are mixed, the reaction is usually complete in 5 or 10 minutes, especially at 40° C. Longer reaction times than this are required for lower temperature. Reaction times up to 24 hours or more can be used. The length of time greater than 24 hours is usually unnecessary but is not harmful under the reaction condition. The reaction equation is

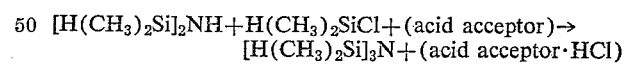

The acid acceptor forms a complex with any hydrogen chloride formed such as pyridine-hydrochloride, α-picoline-hydrochloride, and triethylamine-hydrochloride. The most preferred acid acceptors are those which produce an insoluble acid complex. Insoluble complexes can readily be filtered from the reaction product mixture and further involvement of the complexes is eliminated. Inasmuch as the product, tris(dimethylsilyl)amine, can be recovered by distillation from the reaction mixture, the acid acceptor complex need not be filtered from the solution prior to distillation. Tris(dimethylsilyl)amine can also be recovered by separating any insoluble materials, such as the acid acceptor-hydrochloride complex, by filtration and then distillation. Other methods of recovering liquid products are well known to those skilled in the art. Caution should be used to avoid contacting tris(dimethylsilyl) amine with acids, particularly in the presence of water. The tris(dimethylsilyl)amine is stable to bases such as concentrated ammonium hydroxide.

Another preparation of tris(dimethylsilyl)amine is the addition of triorganomonochlorosilane to bis(dimethylsilyl)amine. Any monovalent hydrocarbon radical can be used in the triorganomonochlorosilane. Preferably, trimethylmonochlorosilane is used. The reaction proceeds as stated above and under the same conditions. The product, tris(dimethylsilyl)amine can be recovered by the same techniques as disclosed above. The reaction equation is

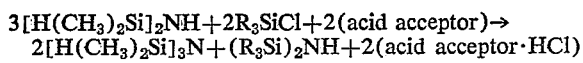

R=monovalent hydrocarbon radical.

Still another preparation of tris(dimethylsilyl)amine is the addition of dimethylmonochlorosilane to bis(triorganosilyl)amine. The preferred organo group is the methyl radical. Reaction, conditions and recovery have been previously described. When bis(triorganosilyl)amines are used, the only organomonochlorosilane which can be used is the dimethylmonochlorosilane. The reaction equation is $$(R_3Si)_2NH + 3H(CH_3)_2SiCl + (\text{acid acceptor}) \rightarrow$$
$$[H(CH_3)_2Si]_3N + 2R_3SiCl + (\text{acid acceptor} \cdot HCl)$$

(R is defined above).

Tris(dimethylsilyl)amine can be used as a cross-linker in polymer systems by reacting in the presence of platinum with unsaturated aliphatic compounds and polymers such as carbon-carbon double bonds. It can be used to make other compounds by reacting unsaturated aliphatic compounds with the silicon-bonded hydrogens in the presence of platinum. Tris(dimethylsilyl)amine can also be used as a monomeric intermediate in the preparation of polymerms, both resinous and elastomeric.

The following examples are illustrative only and should not be construed as limiting the present invention which is properly delineated in the appended claims.

EXAMPLE 1

A charge of 36.0 g. of [H(CH$_3$)$_2$Si]$_2$NH, 25.8 g. of H(CH$_3$)$_2$SiCl and 21.6 g. of pyridine was mixed in an eight ounce bottle with H(CH$_3$)$_2$SiCl added last. The ingredients were allowed to react for 24 hours at room temperature. The product, [H(CH$_3$)$_2$Si]$_3$N, was recovered by distillation. The refractive index at 23° C. was 1.4239, the density at 23° C. was 0.803 g./ml., the boiling point was 150.5° to 151.0° C. at atmospheric pressure. The product, tris(dimethylsilyl)amine, was identified by infrared analysis and nuclear magnetic resonance.

EXAMPLE 2

In a container, 1.33 g. of [H(CH$_3$)$_2$Si]$_2$NH and 0.75 g. of pyridine was mixed to form a solution. To this solution was added 0.08 g. of Me$_3$SiCl. The mixture was agitated by slowly rotating the container for 24 hours at room temperature. The product, [H(CH$_3$)$_2$Si]$_3$N, was recovered by distillation. Infrared analysis and nuclear magnetic resonance analysis were used to characterize the product.

EXAMPLE 3

A mixture of 1 mole of [(CH$_3$)$_3$Si]$_2$NH, 1 mole of pyridine and 3 moles of H(CH$_3$)$_2$SiCl was mixed and allowed to react for 24 hours at room temperature. The product, [H(CH$_3$)$_2$Si]$_3$N, was recovered by distillation. The reaction equation was

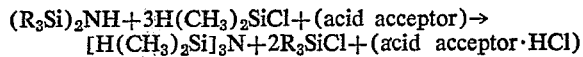

EXAMPLE 4

When 0.01 mole of triethylmonochlorosilane, triphenylmonochlorosilane, vinyldimethylmonochlorosilane, octadecyldiethylmonochlorosilane or benzylvinylmethylmonochlorosilane replace the trimethylmonochlorosilane of Example 2, tris(dimethylsilyl)amine is obtained.

EXAMPLE 5

When 1 mole of bis(triisopropylsilyl)amine, bis(dimethylvinylsilyl)amine, bis(octadecyldimethylsilyl)amine, bis(naphthyldimethylsilyl)amine, bis(diphenylethylsilyl)amine, bis(allyldimethylsilyl)amine or bis[(β-phenylethyl)dimethylsilyl]amine replace bis(trimethylsilyl)amine of Example 3, tris(dimethylsilyl)amine is obtained.

EXAMPLE 6

When 0.28 mole of α-picoline, triethylamine, octyldimethylamine, benzylhexylmethylamine, tri-t-butylamine or dihexylmethylamine replace the pyridine of Example 1, tris(dimethylsilyl)amine is obtained.

That which is claimed is:
1. A method for preparing tris(dimethylsilyl)amine comprising
   (I) mixing in the presence of an acid acceptor selected from the group consisting of pyridine, picolines and tertiary amines,
      (A) bis(dimethylsilyl)amine, and
      (B) dimethylmonochlorosilane, and thereafter
   (II) recovering the tris(dimethylsilyl)amine.
2. The method in accordance with claim 1 in which (A) is always present in excess.
3. The method in accordance with claim 2 in which the excess of (A) is such that the molar ratio of (B) to (A) is 1 to 2.
4. The method in accordance with claim 3 in which the molar ratio is 1 to 4.
5. A method for preparing tris(dimethylsilyl)amine comprising
   (I) mixing in the presence of an acid acceptor selected from the group consisting of pyridine, picolines and tertiary amines,
      (A) bis(dimethylsilyl)amine and
      (B) triorganomonochlorosilane where the organo radical is a monovalent hydrocarbon radical, and thereafter
   (II) recovering the tris(dimethylsilyl)amine.
6. The method in accordance with claim 5 in which the organo group is a methyl radical.
7. The method in accordance with claim 5 in which the acid acceptor is pyridine.
8. A method for preparing tris(dimethylsilyl)amine comprising
   (I) mixing in the presence of an acid acceptor selected from the group consisting of pyridine, picolines and tertiary amines,
      (A) bis(triorganosilyl)amine where the organo radical is a monovalent hydrocarbon radical, and
      (B) dimethylmonochlorosilane, and thereafter
   (II) recovering the tris(dimethylsilyl)amine.
9. The method in accordance with claim 8 in which the organo group is a methyl radical.
10. The method in accordance with claim 8 in which the molar ratio of (B) to (A) is 3 to 1.
11. The method in accordance with claim 1 in which the tris(dimethylsilyl)amine is recovered by distillation from a mixture.
12. The method in accordance with claim 11 in which the mixture is filtered before distillation.
13. The method in accordance with claim 1 in which the acid acceptor is pyridine.
14. The method in accordance with claim 4 in which the acid acceptor is pyridine.
15. The method in accordance with claim 5 in which the tris(dimethylsilyl)amine is recovered by distillation from a mixture.

16. The method in accordance with claim 8 in which the tris(dimethylsilyl)amine is recovered by distillation from a mixture.

17. The method in accordance with claim 15 in which the mixture is filtered before distillation.

18. The method in accordance with claim 16 in which the mixture is filtered before distillation.

19. The method in accordance with claim 8 in which the acid acceptor is pyridine.

20. Tris(dimethylsilyl)amine.

References Cited

UNITED STATES PATENTS

| | | | |
|---|---|---|---|
| 2,429,883 | 10/1947 | Johannson | 260—448.2 X |
| 2,462,635 | 2/1949 | Haber | 260—448.2 |
| 3,046,292 | 7/1962 | Pike | 260—448.2 |
| 3,253,008 | 5/1966 | Fink | 260—448.2 |

TOBIAS E. LEVOW, *Primary Examiner.*

P. F. SHAVER, *Assistant Examiner.*